A. HARGRAVES.
TIRE MOLD.
APPLICATION FILED MAY 21, 1918.
1,289,746.
Patented Dec. 31, 1918.
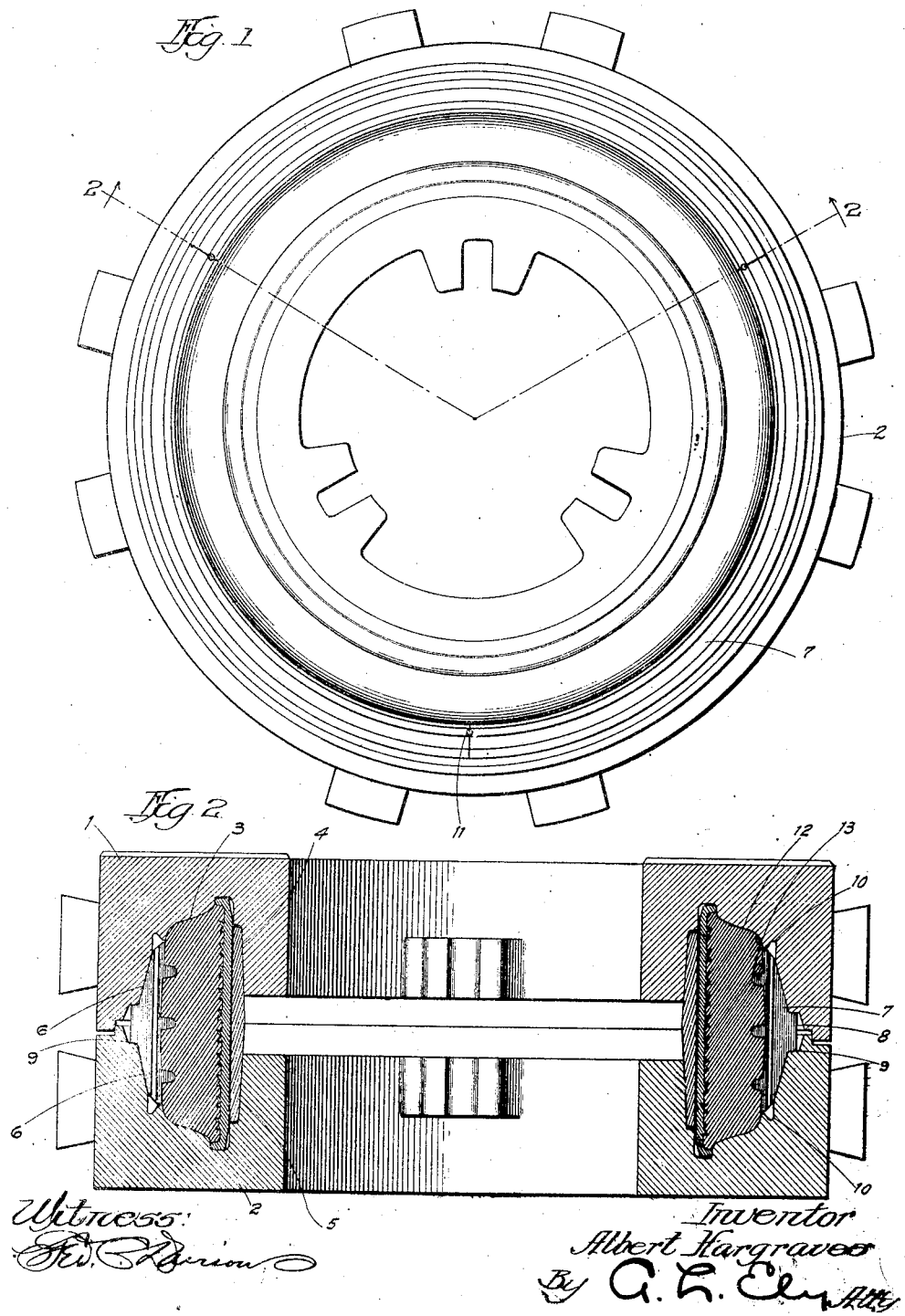

UNITED STATES PATENT OFFICE.

ALBERT HARGRAVES, OF AKRON, OHIO, ASSIGNOR TO THE FIRESTONE TIRE AND RUBBER COMPANY, OF AKRON, OHIO, A CORPORATION OF OHIO.

TIRE-MOLD.

1,289,746.  Specification of Letters Patent.  Patented Dec. 31, 1918.

Application filed May 21, 1918. Serial No. 235,861.

*To all whom it may concern:*

Be it known that I, ALBERT HARGRAVES, a subject of the King of Great Britain, residing in the city of Akron, county of Summit, State of Ohio, have invented certain new and useful Improvements in Tire-Molds, of which the following is a specification.

In the manufacture of automobile and truck tires it is often desirable to make use of a mold equipped with a multiple-part tread ring provided with inclined outer surfaces designed to coöperate with correspondingly inclined surfaces on the inner sides of the mold cavity whereby, when the mold is closed, the ring is caused to contract and pressure is thereby exerted on the tread portion of the tire as is well understood by those skilled in the art. This construction is particularly useful in the manufacture of tires having irregular or indented tread configurations as it causes the irregularities or indentations to be better and more accurately formed.

In former constructions of this nature it frequently happens that sections of the ring will get out of alinement which results in a badly formed tire and is liable to injure the mold. The construction herein shown has been devised to insure the centering and accurate positioning of the mold ring sections, the particular design shown being for the manufacture of large solid tires which are grooved in the tread in accordance with the showing in the Patent to Lee Clough No. 1,268,437, dated June 4, 1918, although its usefulness is not limited to this construction.

In the drawings

Figure 1 is a plan view of half of the mold with the tread ring in place.

Fig. 2 is a cross section on the line 2—2 of Fig. 1.

In the drawings 1 represents the upper half of the mold and 2 the lower half. In each half of the mold is provided a cavity 3 of the shape of the side of the tire and a seat 4 for an internal ring 5. Near the outer edge of the mold is provided an inclined seat 6 and in the two seats is adapted to be placed the multiple-part tread ring 7, the outer surfaces, except for the central portion, being inclined to correspond to the inside of the cavity so that as the mold is closed under pressure the ring will contract. The inner surface is shaped to conform to the finished product in this instance being provided with ribs 13 to form the circumferential groove in the surface of the tire. Around the center of the tread ring is formed a rib 8 which is adapted to seat on the shoulders 9 on the inside of the mold. It is by means of this rib and shoulders that the ring is accurately seated in the mold. At each side of the tread ring are provided cavities for the overflow as at 10, and between sections of the ring are provided additional overflow cavities 11.

The mold is assembled by first placing the tire 12 and the ring 5 in the lower half. The sectional tread ring, which may be in three or more parts, is then placed around the outside of the tire and part way down into the seat 6. The upper part of the mold is now placed and the sectional tread ring seated partially in the cavity. The two parts of the mold are then forced together and the ring is seated as shown in Fig. 2. It will be seen that the rib 8 causes the parts of the ring to be accurately seated in the mold, so that when the mold is closed the tread ring is suspended midway between the tire mold sections whereby the entrances to the overflow cavities are maintained open and the overflow is equally divided above and below the center of the tire, and the ribs are forced into the tire whereby the grooves are formed.

It is obvious that changes and modifications may be made in the design of the mold without departing from the spirit of the invention or sacrificing any of its benefits.

I claim:

1. In a tire mold, the combination of upper and lower mold sections, a separate tread ring between the two sections of the mold, overflow cavities above and below the center line of the tire, entrances to said cavities being provided at the upper and lower sides of said tread ring, a centering formation on said tread ring, and means on said mold adapted to coöperate with said formation to support said ring, whereby the entrances to said cavities are maintained unobstructed when the mold is closed.

2. In a tire mold, the combination of upper and lower mold sections, a separate sectional tread ring between the two mold sections, overflow cavities, entrances to said cavities being provided between said mold sections and said ring, mating projections and recesses between said sections and said ring, adapted to position said ring, whereby the entrances to said cavities are maintained unobstructed when the mold is closed.

3. In a tire mold, the combination of upper and lower mold sections, a separate sectional tread ring between the two sections, overflow cavities, entrances to said cavities being provided at the upper and lower sides of said tread ring, inclined surfaces on the outside of the tread ring and coöperating inclined surfaces on the mold sections, and a mating projection and recess in the ring and mold adapted to position said ring when the mold is closed so that the entrances to said cavities are maintained open when the mold is closed.

4. In a tire mold, the combination of upper and lower mold sections, a separate sectional tread ring between the two sections, overflow cavities, inclined surfaces on the outside of the tread ring and coöperating inclined surfaces on the mold sections, a rib on the center of said tread ring, one of the mold sections being provided with a recess adapted to receive said rib, the inside upper and lower edges of said ring being spaced from said mold sections when the mold is closed, said ring being suspended in said mold by the rib, whereby there are provided spaces at the sides of said ring, the said spaces communicating with said overflow cavities.

5. In a tire mold, the combination of upper and lower mold sections, a separate tread ring between the two sections of the mold, overflow cavities in the mold sections, entrances to said cavities being provided at the sides of said ring, a rib on said ring adapted to be received between said mold sections and to support the ring on the lower section, whereby the entrances to said cavities are maintained unobstructed when the mold is closed.

ALBERT HARGRAVES.